US012628076B2

(12) United States Patent (10) Patent No.: US 12,628,076 B2
Velev et al. (45) Date of Patent: May 12, 2026

(54) DATA CONNECTION ESTABLISHMENT IN RESPONSE TO A DISASTER CONDITION

(71) Applicant: Lenovo (Singapore) Pte. Ltd., New Tech Park (SG)

(72) Inventors: Genadi Velev, Darmstadt (DE); Apostolis Salkintzis, Athens (GR); Dimitrios Karampatsis, Ruislip (GB); Roozbeh Atarius, La Jolla, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 321 days.

(21) Appl. No.: 18/547,120

(22) PCT Filed: Feb. 18, 2021

(86) PCT No.: PCT/EP2021/054015
§ 371 (c)(1),
(2) Date: Aug. 18, 2023

(87) PCT Pub. No.: WO2022/174902
PCT Pub. Date: Aug. 25, 2022

(65) Prior Publication Data
US 2024/0129845 A1 Apr. 18, 2024

(51) Int. Cl.
*H04W 48/18* (2009.01)
*H04W 48/02* (2009.01)

(52) U.S. Cl.
CPC ........... *H04W 48/18* (2013.01); *H04W 48/02* (2013.01)

(58) Field of Classification Search
CPC ..... H04W 48/18; H04W 48/02; H04W 76/50; H04L 67/141; H04L 61/4511; H04L 69/40; G08B 27/006
See application file for complete search history.

(56) References Cited

U.S. PATENT DOCUMENTS 8,775,643 B2 * 7/2014 Hao ........................ H04W 8/18
709/228
12,192,881 B2 * 1/2025 Guttman ................. H04L 69/40
(Continued)

FOREIGN PATENT DOCUMENTS

EP 2445244 A1 4/2012
EP 2117251 B1 * 1/2018 ............ H04W 76/50
(Continued)

OTHER PUBLICATIONS

PCT/EP2021/054015, "International Search Report and the Written Opinion of the International Searching Authority, or the Declaration", International Searching Authority, Nov. 29, 2021, pp. 1-14.
(Continued)

*Primary Examiner* — Julio R Perez
(74) *Attorney, Agent, or Firm* — Kunzler Needham Hilton

(57) ABSTRACT

Apparatuses, methods, and systems are disclosed for data connection establishment in response to a disaster condition. One method includes receiving, at a first network function in a first mobile communication network, a first message from a second network function in the first mobile communication network. The first message includes a data connection establishment request from a user equipment and a disaster indication indicating that the data connection establishment request is in response to a disaster condition in a second mobile communication network, and the disaster condition disables the user equipment from connecting to the second mobile communication network. The method includes determining destination addresses in the second mobile communication network. The method includes configuring a data connection corresponding to the data connection establishment request to accept data traffic between the user equipment and the destination addresses.

19 Claims, 8 Drawing Sheets

(56) References Cited

U.S. PATENT DOCUMENTS

| | | | | |
|---|---|---|---|---|
| 2019/0306251 A1* | 10/2019 | Talebi Fard | .......... | H04W 76/10 |
| 2022/0225214 A1* | 7/2022 | Vamanan | ................ | H04W 4/90 |
| 2022/0240213 A1* | 7/2022 | Ly | ........................ | H04W 60/04 |
| 2024/0292298 A1* | 8/2024 | Liu | ....................... | H04W 60/04 |

FOREIGN PATENT DOCUMENTS

| | | | | | |
|---|---|---|---|---|---|
| GB | 2604723 A | * | 9/2022 | .............. | H04W 4/90 |
| WO | WO-2011055773 A1 | * | 5/2011 | ............ | H04W 80/04 |
| WO | 2019122494 A1 | | 6/2019 | | |
| WO | 2020141964 A1 | | 7/2020 | | |

OTHER PUBLICATIONS

3GPP, "3rd Generation Partnership Project; Technical Specification Group Services and System Aspects; Study on Support for Minimization of Service Interruption (Release 17)", 3GPP TR 22.831 V17.1.0, Dec. 2019, pp. 1-19.

3GPP, "3rd Generation Partnership Project; Technical Specification Group Core Network and Terminals; Study on the support for minimization of service interruption; (Release 17)", 3GPP TR 24.811 V0.1.0, Dec. 2020, pp. 1-14.

3GPP, "3rd Generation Partnership Project; Technical Specification Group Services and System Aspects; Service requirements for the 5G system; Stage 1 (Release 18)", 3GPP TS 22.261 V18.1.1, Jan. 2021, pp. 1-85.

3GPP, "3rd Generation Partnership Project; Technical Specification Group Services and System Aspects; System architecture for the 5G System (5GS); Stage 2 (Release 16)", 3GPP TS 23.501 V16.7.0, Dec. 2020, pp. 1-450.

3GPP, "3rd Generation Partnership Project; Technical Specification Group Services and System Aspects; Procedures for the 5G System (5GS); Stage 2 (Release 16)", 3GPP TS 23.502 V16.7.0, Dec. 2020, pp. 1-603.

* cited by examiner

100

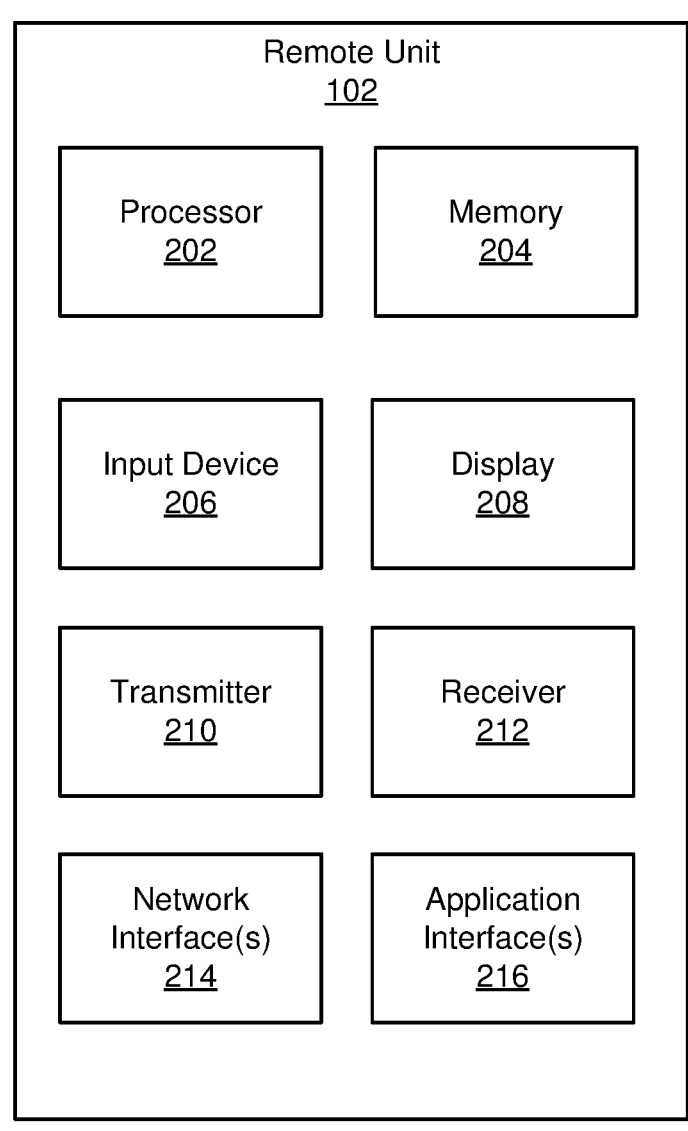
Remote Unit
102
Processor
202
Memory
204
Input Device
206
Display
208
Transmitter
210
Receiver
212
Network
Interface(s)
214
Application
Interface(s)
216
FIG. 2

300

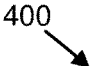
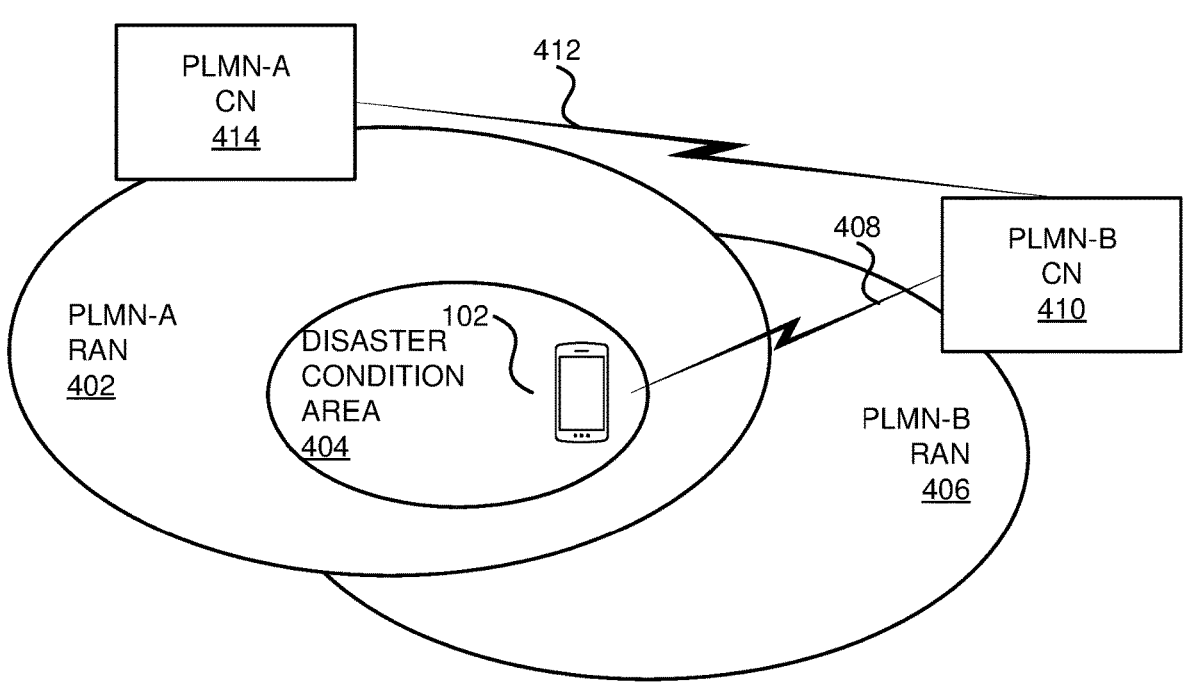
FIG. 4

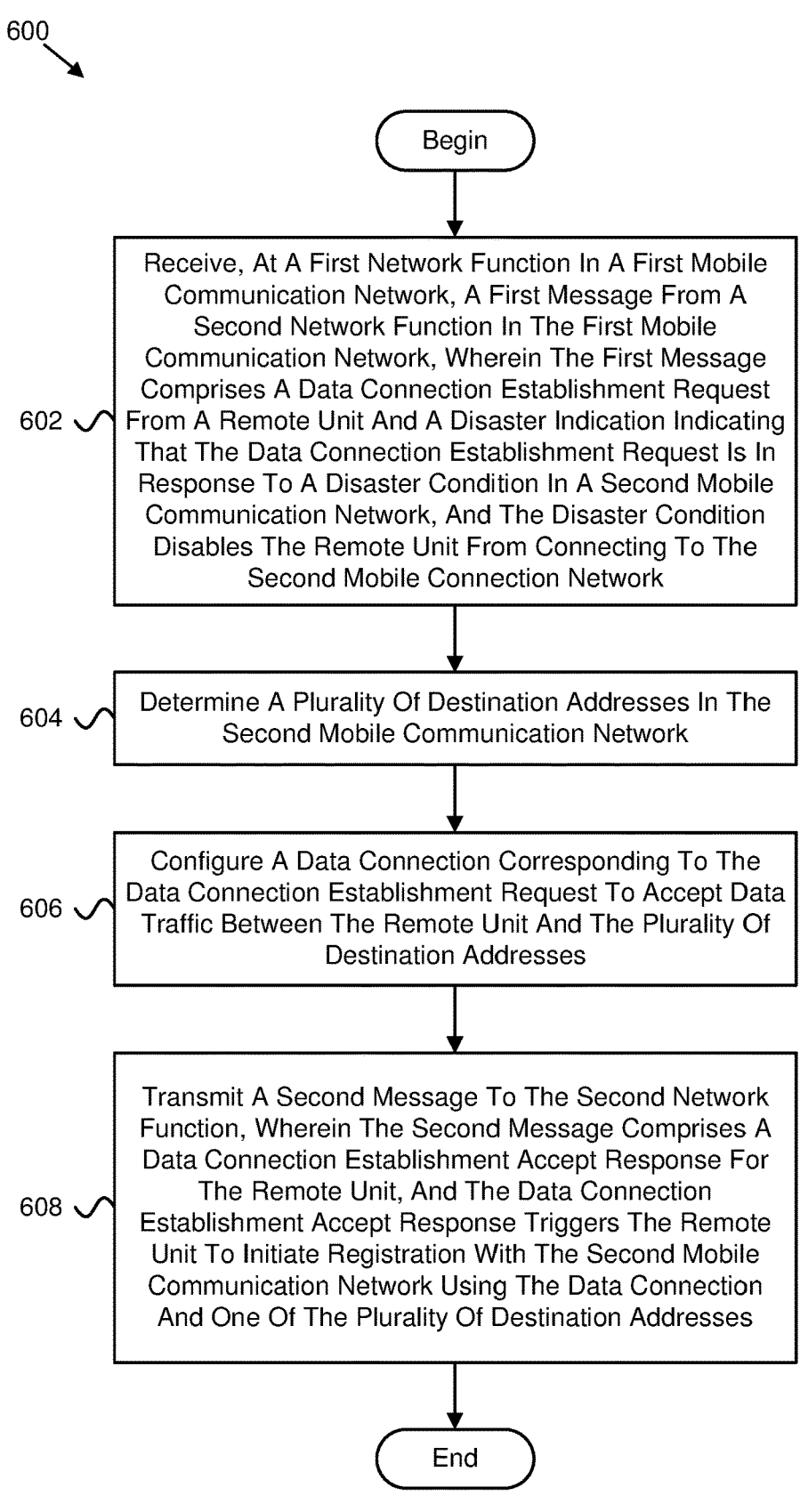

600

Begin

602 — Receive, At A First Network Function In A First Mobile Communication Network, A First Message From A Second Network Function In The First Mobile Communication Network, Wherein The First Message Comprises A Data Connection Establishment Request From A Remote Unit And A Disaster Indication Indicating That The Data Connection Establishment Request Is In Response To A Disaster Condition In A Second Mobile Communication Network, And The Disaster Condition Disables The Remote Unit From Connecting To The Second Mobile Connection Network 604 — Determine A Plurality Of Destination Addresses In The Second Mobile Communication Network 606 — Configure A Data Connection Corresponding To The Data Connection Establishment Request To Accept Data Traffic Between The Remote Unit And The Plurality Of Destination Addresses 608 — Transmit A Second Message To The Second Network Function, Wherein The Second Message Comprises A Data Connection Establishment Accept Response For The Remote Unit, And The Data Connection Establishment Accept Response Triggers The Remote Unit To Initiate Registration With The Second Mobile Communication Network Using The Data Connection And One Of The Plurality Of Destination Addresses End

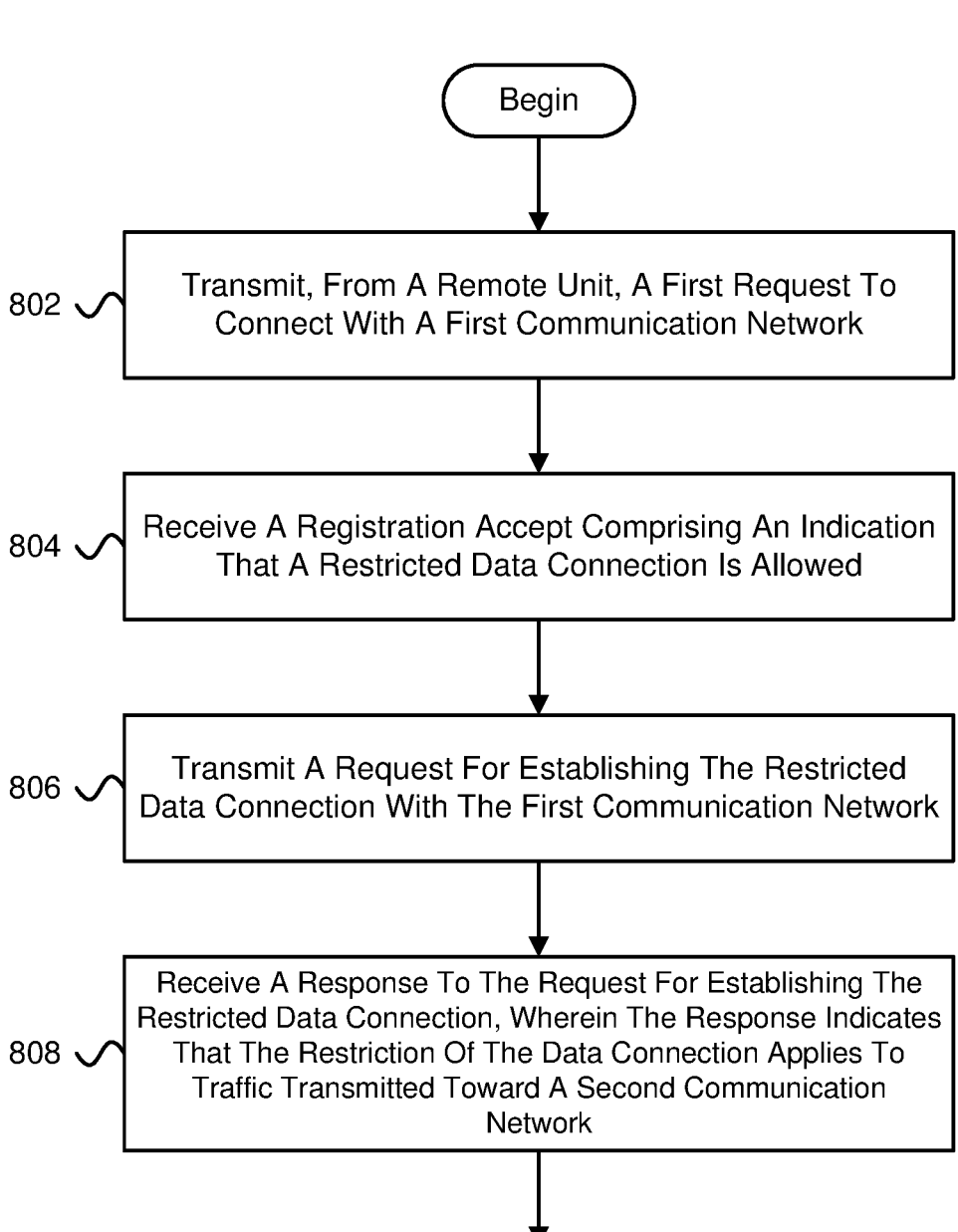

Begin

802    Transmit, From A Remote Unit, A First Request To Connect With A First Communication Network 804    Receive A Registration Accept Comprising An Indication That A Restricted Data Connection Is Allowed 806    Transmit A Request For Establishing The Restricted Data Connection With The First Communication Network 808    Receive A Response To The Request For Establishing The Restricted Data Connection, Wherein The Response Indicates That The Restriction Of The Data Connection Applies To Traffic Transmitted Toward A Second Communication Network End

FIG. 8

DATA CONNECTION ESTABLISHMENT IN RESPONSE TO A DISASTER CONDITION

FIELD

The subject matter disclosed herein relates generally to wireless communications and more particularly relates to data connection establishment in response to a disaster condition.

BACKGROUND

In certain wireless communications networks, a user equipment may be in an area within a first public land mobile network that is affected by a disaster condition. The user equipment may not be able to access the first public land mobile network, but may be able to access a second public land mobile network.

BRIEF SUMMARY

Methods for data connection establishment in response to a disaster condition are disclosed. Apparatuses and systems also perform the functions of the methods. One embodiment of a method includes receiving, at a first network function in a first mobile communication network, a first message from a second network function in the first mobile communication network, wherein the first message includes a data connection establishment request from a remote unit and a disaster indication indicating that the data connection establishment request is in response to a disaster condition in a second mobile communication network, and the disaster condition disables the remote unit from connecting to the second mobile connection network. In some embodiments, the method includes determining a plurality of destination addresses in the second mobile communication network. In various embodiments, the method includes configuring a data connection corresponding to the data connection establishment request to accept data traffic between the remote unit and the plurality of destination addresses. In certain embodiments, the method includes transmitting a second message to the second network function, wherein the second message comprises a data connection establishment accept response for the remote unit, and the data connection establishment accept response triggers the remote unit to initiate registration with the second mobile communication network using the data connection and one of the plurality of destination addresses.

One apparatus for data connection establishment in response to a disaster condition includes a receiver that receives a first message from a second network function in the first mobile communication network. The first message includes a data connection establishment request from a remote unit and a disaster indication indicating that the data connection establishment request is in response to a disaster condition in a second mobile communication network, and the disaster condition disables the remote unit from connecting to the second mobile connection network. In various embodiments, the apparatus includes a processor that: determines a plurality of destination addresses in the second mobile communication network; and configures a data connection corresponding to the data connection establishment request to accept data traffic between the remote unit and the plurality of destination addresses. In some embodiments, the apparatus includes a transmitter that transmits a second message to the second network function, wherein the second message comprises a data connection establishment accept response for the remote unit, and the data connection establishment accept response triggers the remote unit to initiate registration with the second mobile communication network using the data connection and one of the plurality of destination addresses.

In certain embodiments, a method for data connection establishment in response to a disaster condition includes receiving, at a second network function of a first communication network, a registration request from a remote unit to register with the first communication network. In some embodiments, the method includes transmitting a registration accept to the remote unit. The registration accept includes an indication that a restricted data connection is allowed. In various embodiments, the method includes transmitting, to a first network function, a request during a data connection establishment procedure for the restricted data connection, wherein the request comprises: an indication that the data connection is requested in response to a disaster condition in a second communication network; a second communication network identifier; a request for confirmation from the first network function that the remote unit has successfully registered with the second communication network; or some combination thereof. In certain embodiments, the method includes receiving a notification from the first network function that the remote unit has successfully registered with the second communication network.

In various embodiments, an apparatus for data connection establishment in response to a disaster condition includes a receiver that receives a registration request from a remote unit to register with the first communication network. In various embodiments, the apparatus includes a transmitter that: transmits a registration accept to the remote unit, wherein the registration accept includes an indication that a restricted data connection is allowed; and transmits, to a first network function, a request during a data connection establishment procedure for the restricted data connection, wherein the request comprises: an indication that the data connection is requested in response to a disaster condition in a second communication network; a second communication network identifier; a request for confirmation from the first network function that the remote unit has successfully registered with the second communication network; or some combination thereof. In some embodiments, the receiver receives a notification from the first network function that the remote unit has successfully registered with the second communication network.

In one embodiment, a method for data connection establishment in response to a disaster condition includes transmitting, from a remote unit, a first request to connect with a first communication network. In some embodiments, the method includes receiving a registration accept including an indication that a restricted data connection is allowed. In various embodiments, the method includes transmitting a request for establishing the restricted data connection with the first communication network. In certain embodiments, the method includes receiving a response to the request for establishing the restricted data connection. The response indicates that the restriction of the data connection applies to traffic transmitted toward a second communication network.

In certain embodiments, an apparatus for data connection establishment in response to a disaster condition includes a transmitter that transmits a first request to connect with a first communication network. In various embodiments, the apparatus includes a receiver that receives a registration accept including an indication that a restricted data connection is allowed. In some embodiments, the transmitter transmits a request for establishing the restricted data connection with the first communication network; and the receiver receives a response to the request for establishing the restricted data connection. The response indicates that the restriction of the data connection applies to traffic transmitted toward a second communication network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a schematic block diagram illustrating one embodiment of an apparatus that may be used for data connection establishment in response to a disaster condition;

FIG. 4 is a schematic block diagram illustrating one embodiment of a disaster condition;

FIG. 6 is a flow chart diagram illustrating one embodiment of a method for data connection establishment in response to a disaster condition;

FIG. 8 is a flow chart diagram illustrating a further embodiment of a method for data connection establishment in response to a disaster condition.

DETAILED DESCRIPTION

Figure 1:
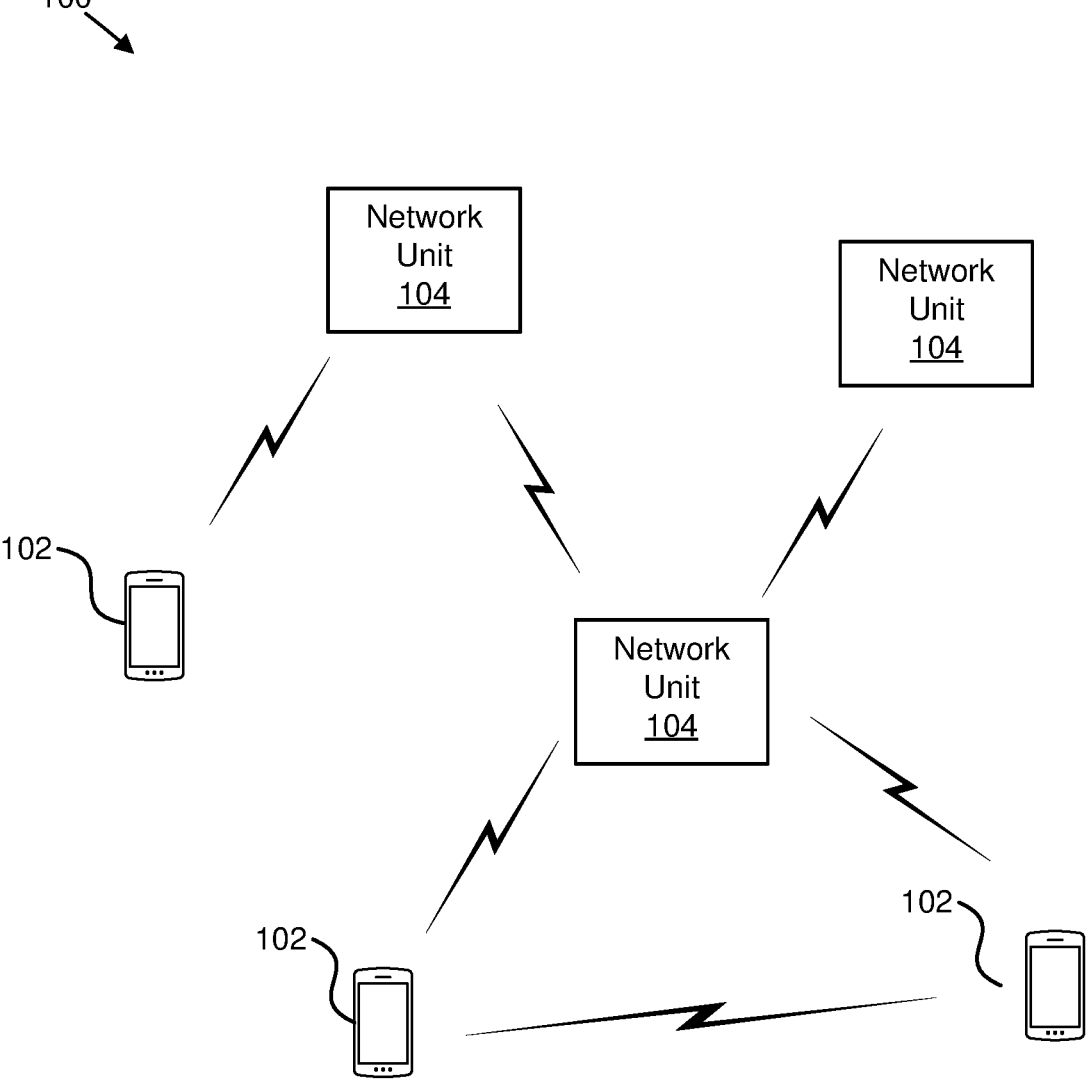
FIG. 1 is a schematic block diagram illustrating one embodiment of a wireless communication system for data connection establishment in response to a disaster condition.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for data connection establishment in response to a disaster condition. In one embodiment, the wireless communication system 100 includes remote units 102, and network units 104. Even though a specific number of remote units 102, and network units 104 are depicted in FIG. 1, one of skill in the art will recognize that any number of remote units 102, and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive, at a first network function in a first mobile communication network, a first message from a second network function in the first mobile communication network. The first message includes a data connection establishment request from a remote unit (e.g., the remote unit 102) and a disaster indication indicating that the data connection establishment request is in response to a disaster condition in a second mobile communication network, and the disaster condition disables the remote unit from connecting to the second mobile connection network. In some embodiments, the network unit 104 may determine a plurality of destination addresses in the second mobile communication network. In various embodiments, the network unit 104 may configure a data connection corresponding to the data connection establishment request to accept data traffic between the remote unit and the plurality of destination addresses. In certain embodiments, the network unit 104 may transmit a second message to the second network function. The second message includes a data connection establishment accept response for the remote unit, and the data connection establishment accept response triggers the remote unit to initiate registration with the second mobile communication network using the data connection and one of the plurality of destination addresses. Accordingly, the network unit 104 may be used for data connection establishment in response to a disaster condition.

In certain embodiments, a network unit 104 may receive, at a second network function of a first communication network, a registration request from a remote unit (e.g., the remote unit 102) to register with the first communication network. In some embodiments, the network unit 104 may transmit a registration accept to the remote unit. The registration accept includes an indication that a restricted data connection is allowed. In various embodiments, the network unit 104 may transmit, to a first network function, a request during a data connection establishment procedure for the restricted data connection, wherein the request comprises: an indication that the data connection is requested in response to a disaster condition in a second communication network; a second communication network identifier; a request for confirmation from the first network function that the remote unit has successfully registered with the second communication network; or some combination thereof. In certain embodiments, the network unit 104 may receive a notification from the first network function that the remote unit has successfully registered with the second communication network. Accordingly, the network unit 104 may be used for data connection establishment in response to a disaster condition.

In various embodiments, a remote unit 102 may transmit, from a remote unit (e.g., the remote unit 102), a first request to connect with a first communication network. In some embodiments, the remote unit 102 may receive a registration accept including an indication that a restricted data connection is allowed. In various embodiments, the remote unit 102 may transmit a request for establishing the restricted data connection with the first communication network. In certain embodiments, the remote unit 102 may receive a response to the request for establishing the restricted data connection. The response indicates that the restriction of the data connection applies to traffic transmitted toward a second communication network. Accordingly, the remote unit 102 may be used for data connection establishment in response to a disaster condition.

FIG. 2 depicts one embodiment of an apparatus 200 that may be used for data connection establishment in response to a disaster condition. The apparatus 200 includes one embodiment of the remote unit 102. Furthermore, the remote unit 102 may include a processor 202, a memory 204, an input device 206, a display 208, a transmitter 210, a receiver 212, one or more network interfaces 214, and one or more application interfaces 216. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 transmits a first request to connect with a first communication network. In various embodiments, the receiver 212 receives a registration accept including an indication that a data connection is allowed. In some embodiments, the transmitter 210 transmits a request for establishing the restricted data connection with the first communication network; and the receiver 212 receives a response to the request for establishing the restricted data connection. The response indicates that the restriction of the data connection applies to traffic transmitted toward a second communication network.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
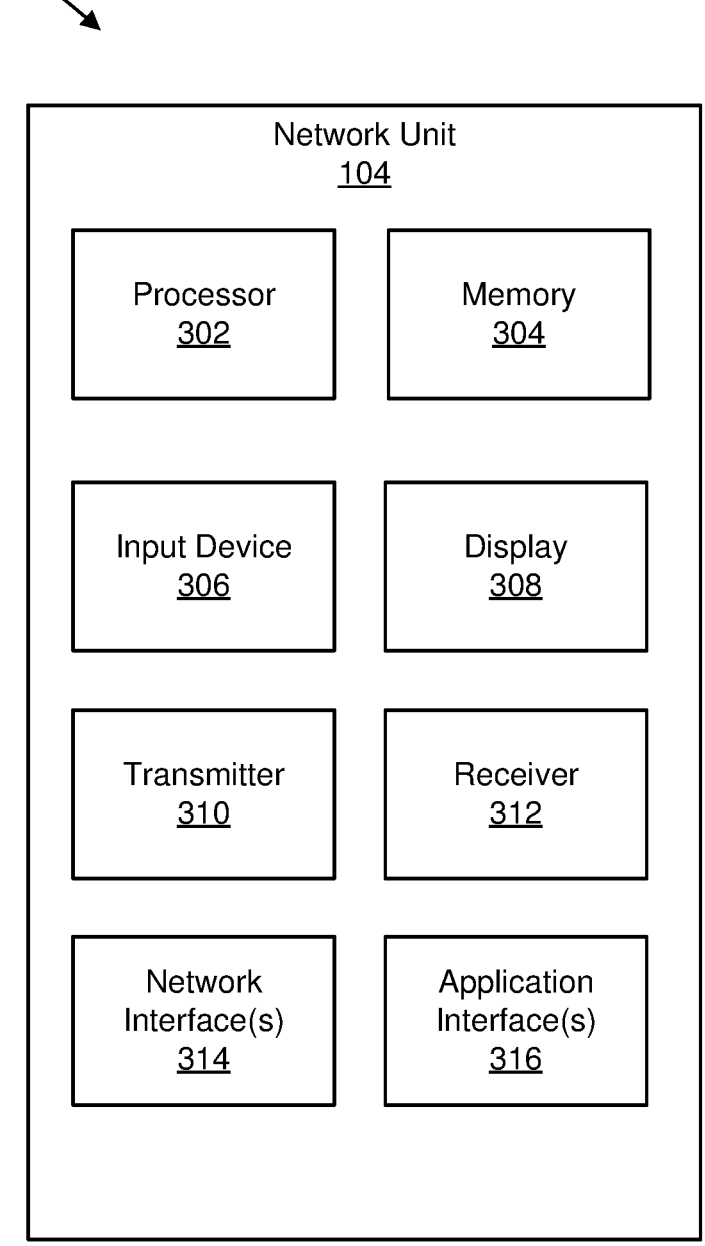
FIG. 3 is a schematic block diagram illustrating another embodiment of an apparatus that may be used for data connection establishment in response to a disaster condition.

FIG. 3 depicts another embodiment of an apparatus 300 that may be used for data connection establishment in response to a disaster condition. The apparatus 300 includes one embodiment of the network unit 104. Furthermore, the network unit 104 may include a processor 302, a memory 304, an input device 306, a display 308, a transmitter 310, a receiver 312, one or more network interfaces 314, and one or more application interfaces 316. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In one embodiment, the receiver 312 receives a first message from a second network function in the first mobile communication network. The first message includes a data connection establishment request from a remote unit and a disaster indication indicating that the data connection establishment request is in response to a disaster condition in a second mobile communication network, and the disaster condition disables the remote unit from connecting to the second mobile connection network. In various embodiments, the processor 302: determines a plurality of destination addresses in the second mobile communication network; and configures a data connection corresponding to the data connection establishment request to accept data traffic between the remote unit and the plurality of destination addresses. In some embodiments, the transmitter 310: transmits a second message to the second network function. The second message includes a data connection establishment accept response for the remote unit, and the data connection establishment accept response triggers the remote unit to initiate registration with the second mobile communication network using the data connection and one of the plurality of destination addresses.

In various embodiments, the receiver 312 receives a registration request from a remote unit to register with the first communication network. In various embodiments, the transmitter 310: transmits a registration accept to the remote unit, wherein the registration accept includes an indication that a restricted data connection is allowed; and transmits, to a first network function, a request during a data connection establishment procedure for the restricted data connection, wherein the request comprises: an indication that the data connection is requested in response to a disaster condition in a second communication network; a second communication network identifier; a request for confirmation from the first network function that the remote unit has successfully registered with the second communication network; or some combination thereof. In some embodiments, the receiver 312 receives a notification from the first network function that the remote unit has successfully registered with the second communication network.

In some embodiments, various embodiments used by a 5G system ("5GS") may be high reliability and/or high availability of a communication service. These features may be available to any type of subscriber such as in conditions in which a portion of a network is not available. In various embodiments, a radio access network ("RAN") may have a single point of failure (e.g., antenna towers, single power or communication cable in a fronthaul or backhaul), such that due to extreme conditions, one or more cells may become unavailable. Such conditions may be called disaster conditions ("DisaC"). During disaster conditions, some subscribers may be out of network coverage. In such embodiments, to offer access to general public services, but also to specific vertical services, a subscriber may be able to use the services of another network that is not in a list of preferred networks and/or which is in a list of forbidden networks.

FIG. 4 is a schematic block diagram 400 illustrating one embodiment of a disaster condition. The schematic block diagram 400 illustrates a public land mobile network A ("PLMN-A") RAN 402 having a disaster condition area 404 in which a remote unit 102 resides, and a public land mobile network B ("PLMN-B") RAN 406. The remote unit 102 (e.g., UE) is a subscriber of the PLMN-A RAN 402 (or may be roaming to a visited PLMN-A). Due to a disaster condition in the disaster condition area 404, the remote unit 102 may be outside of the RAN coverage of the PLMN-A RAN 402, but in the coverage of the PLMN-B RAN 406. The PLMN-B RAN 406 may not be in the remote unit's 102 preferred list of PLMNs or the PLMN-B RAN 406 may be in a list of forbidden PLMNs. It should be noted that the PLMN-A or PLMN-B may be non-public networks (e.g., a standalone non non-public network ("SNPN")).

Due to the disaster conditions, the remote unit 102 may select the PLMN-B RAN 406 network and may be able to register with the PLMN-B RAN 406. The remote unit 102 may be described as a disaster inbound roamer with respect to the PLMN-B RAN 406, which means that the PLMN-B RAN 406 may be aware that the remote unit 102 may be roaming due to disaster conditions. In certain embodiments, there may be two options for how the remote unit 102 traffic may reach public or other subscribed services: a communication 408 from the remote unit 102 to a PLMN-B core network ("CN") 410 to initiate local-break-out ("LBO") traffic; and the communication 408 to initiate home-routed ("HR") traffic that uses a communication 412 from the PLMN-B CN 410 to the PLMN-A CN 414. If the remote unit 102 is subscribed to use voice or SMS services from the PLMN-A, the remote unit 102 should use a home network (e.g., PLMN-A) and/or HR traffic may be supported.

In various embodiments, PLMN-A and PLMN-B may not be roaming partners and there may be no pre-set standard-compliant roaming interfaces. However, PLMN-B may be aware that DisaC happened in the PLMN-A network.

In some embodiments, a user equipment ("UE") may be able to use HR traffic if roaming interfaces between PLMN-A and PLMN-B are not in place. In other words, the UE may use subscribed services in PLMN-A (e.g., voice, SMS, data) even though there are no roaming interfaces in place. In certain embodiments, a PLMN-B may determine to accept a UE registration (e.g., without being able to perform primary network authentication) and may limit the access of a UE by allowing the UE to connect to a PLMN-A.

In certain embodiments, a PLMN-B is aware that DisaC happened in a PLMN-A, leaving a specific location area without radio signal, and the PLMN-B may have been informed about the DisaC. In such embodiments, the PLMN-B may be configured to accept registration requests from UEs from PLMN-A in the specific location area. Due to missing roaming interfaces with PLMN-A, the PLMN-B may accept registrations from UEs only for limited access in PLMN-B. In one example, the limited access may mean that only data traffic having a destination of PLMN-A may be allowed.

In various embodiments, a UE may be able to differentiate a network selection of PLMN-B as a normal selection or a selection due to DisaC. In other words, the UE may be able to differentiate a registration request due to disaster roaming and a normal registration request.

In some embodiments, a PLMN-B provides a limited connectivity service to inbound roamers (e.g., disaster inbound roamers) from PLMN-A that enables communication only with endpoints in PLMN-A. For this purpose, the PLMN-B (e.g., an SMF in PLMN-B) derives filter rules for the traffic on the user plane and configures the user plane function to perform filtering allowing only traffic to a non-third generation partnership project interworking function ("N3IWF") of PLMN-A.

It should be noted that the N3IWF is a function in a 5G system which terminates an IPsec tunnel (e.g., based on IKEv2/IPsec protocols) having a user equipment ("UE") as an other terminating point.

Figure 5:
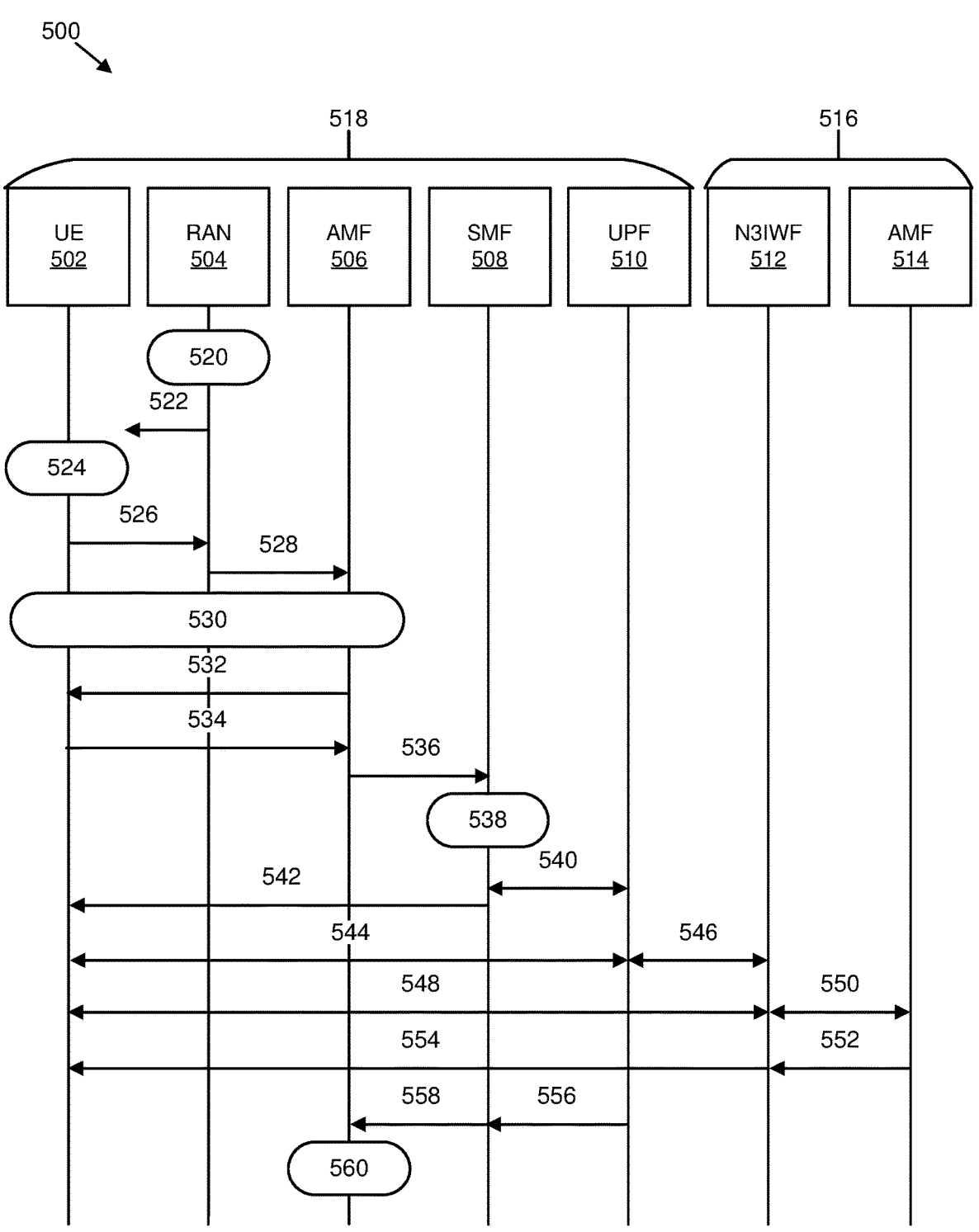
FIG. 5 is a communications diagram illustrating one embodiment of communications for data connection establishment in response to a disaster condition.

FIG. 5 shows a detailed procedure to access services in a home network (e.g., PLMN-A) via a limited connectivity service in PLMN-B. Specifically, FIG. 5 is a communications diagram illustrating one embodiment of communications 500 for data connection establishment in response to a disaster condition. The communications 500 include messages transmitted between a UE 502, a RAN 504, an AMF 506, an SMF 508, a UPF 510, an N3IWF 512, and an AMF 514. The N3IWF 512 and the AMF 514 may be part of a first public land mobile network ("PLMN") 516 (e.g., PLMN-A, home public land mobile network ("HPLMN")). Moreover, the UE 502, the RAN 504, the AMF 506, the SMF 508 and the UPF 510 may be part of a second PLMN 518 (e.g., PLMN-B). As may be appreciated, each communication of the communications 500 may include one or more messages.

The PLMN-B 518 may learn that a disaster happened in PLMN-A 516, affecting a particular location area, and may configure 520 the RAN 504 entities in an area to start broadcasting system information ("SI") that UEs from PLMN-A 516 may be served in PLMN-B 518 due to DisaC. For example, the PLMN-B's 518 OAM system may be informed about the DisaC in a particular location area of PLMN-A 516. In response, the OAM system may configure the RAN 504 entities in the area to broadcast 522 an indication that UEs from PLMN-A 516 may use the PLMN-B 518 communications services due to DisaC in PLMN-A 516.

The UE 502 may be located in the area affected by the disaster and may have lost coverage from PLMN-A 516. Also, the UE 502 may not find any suitable cell from a list of preferred and/or allowed PLMNs. Based on the broadcast indication in the SI of the PLMN-B 518 cell, the UE 502 determines that the PLMN-A 516 experiences DisaC. The UE 502 applies 524 the network selection procedure for DisaC and, as a result, the UE 502 selects to camp on a cell from PLMN-B 518.

The UE's 502 non-access stratum ("NAS") layer may be informed about a selected cell of PLMN-B 518. The NAS layer may create and send an NAS registration request message in the PLMN-B 518. The NAS layer triggers the AS layer to establish a radio resource control ("RRC") connection which indicates that the connection is due to DisaC. With this, the NAS layer may enter a registration sub-state specific to the DisaC situation.

In a first communication 526 transmitted from the UE 502 to the RAN 504, the RRC entity in the UE 502 sends an RRC connection request message including a DisaC indication to the RAN 504. This indication may be used at the RAN 504 node to apply access control or access admission specific for DisaC UEs (e.g., disaster inbound roamers from PLMN-A). In addition, the RAN 504 node may use this indication to select a specific AMF (e.g., the AMF 506) configured to serve DisaC UEs. In a second communication 528 transmitted from the RAN 504 to the AMF 506, the RAN 504 node may send a DisaC indication in an N2 setup request message to the selected AMF 506. The AMF 506 may determine to apply a registration procedure for disaster inbound roamers based on the DisaC indication from the RAN 504 node.

In the second communication 528, an NAS registration request message may include a subscription concealed identifier ("SUCI"), which is based on a HPLMN subscription permanent identifier ("SUPI") and credentials, as the UE 502 may not be aware of whether the PLMN-B 518 has a roaming interface with the HPLMN and whether primary network authentication may be applied. The NAS registration request message 528 may be nested in the first communication 526.

In various embodiments, if the UE 502 was previously registered in its HPLMN, the PLMN identifier ("ID") part of the SUCI may contain the HPLMN ID and the UE 502 may not need to include further indications regarding the PLMN ID. However, if the PLMN-A 516 is not the HPLMN, the UE 502 may include the PLMN-A 516 (e.g., the source PLMN where the UE 502 experienced the DisaC).

In some embodiments, the UE 502 may include an indication in the NAS registration request message that the registration is due to DisaC. The AMF 506 may use this indication to determine whether to accept the UE 502 registration as a disaster inbound roamer for DisaC service as described in the following steps.

In a third communication 530 transmitted between the UE 502, the RAN 504, and the AMF 506, the AMF 506 determines that the registration is due to DisaC in PLMN-A 516 and, since the AMF 506 cannot communicate with PLMN-A 516 due to not having roaming agreements, the AMF 506 may determine to apply local registration for DisaC (e.g., "local" may mean registration without authentication with the UE's 502 HPLMN, although the AMF 506 may know the HPLMN ID but may not be able to communicate with the HPLMN due to missing roaming interfaces). The AMF 506 may have local configuration data applicable for DisaC registrations and such configuration data may be configured from an OAM as per step 520 and/or 522.

The AMF 506 may determine to not perform primary authentication for this UE 502 since it cannot communicate with an authentication server function ("AUSF") in PLMN-A 516. Instead, the AMF 506 may initiate a security exchange with the UE 502 to derive security keys to protect NAS signaling and UP communication.

In a fourth communication 532 transmitted from the AMF 506 to the UE 502, the AMF 506 sends a registration accept message to the UE 502 including an allowed network slice selection assistance information ("NSSAI") which may contain a single network slice selection assistance information ("S-NSSAI") identifying a network slice that provides DisaC services in PLMN-B 518. The UE 502 may use this S-NSSAI in subsequent protocol data unit ("PDU") session establishment requests.

In certain embodiments, the AMF 506 may send in the registration accept message an indication telling the UE 502 that only a single PDU session is allowed which may be used for communication with a specific destination (e.g., with an N3IWF in PLMN-A 516). This indication may internally trigger the UE 502 to establish the PDU session and then discover the N3IWF 512 and initiate 5G registration to PLMN-A 516 (e.g., HPLMN) via untrusted non-third generation partnership program ("non-3GPP") access using the discovered N3IWF 512. This indication may be sent to the UE 502 only if the roaming interfaces with the PLMN-A 516 are not in place and a restricted DisaC access is granted to the UE 502 (e.g., the allowed connectivity services may be for a specific destination such as addresses in PLMN-A 516).

In various embodiments, such as in some UE 502 configurations, the UE 502 may use an allowed S-NSSAI to request multiple PDU sessions (e.g., default PDU sessions for data access and internet protocol ("IP") multimedia core network subsystem ("IMS") PDU session for voice services). The indication in the registration accept message may help the UE 502 to determine that only a default PDU session for data services over the single allowed S-NSSAI may be used.

In some embodiments, the UE 502 may determine such a limitation implicitly in the UE 502 using the conditions: a) the UE 502 has requested DisaC registration with the PLMN-B 518 and the registration is successful; and/or b) no primary authentication was performed. Based on the combination of these two conditions, the UE 502 may internally determine to request a single default PDU session. However, the UE's 502 internal determination may not be as reliable as the explicit indication sent by the AMF 506.

In a fifth communication 534 transmitted from the UE 502 to the AMF 506, the UE 502 may send an UL NAS transport message containing a PDU session establishment request to the AMF 506. The AMF 506 selects the SMF 508 in PLMN-B 518 (e.g., by applying the received DisaC configuration data) and, in a sixth communication 536, the AMF 506 sends an Nsmf_PDUSession_CreateSMContext request to the SMF 508 requesting to establish a PDU session for the UE 502. The SMF 508 receives an indication that the requested PDU session is due to DisaC. This indication may be received directly from the UE 502, which includes the indication in the PDU session establishment request, or from the AMF 506, which includes the indication in the Nsmf_PDUSession_CreateSMContext request.

In certain embodiments, the AMF 506 may include in the Nsmf_PDUSession_CreateSMContext request the PLMN-A ID as an indication to the SMF 508 to know which PLMN ID this UE 502 belongs to. The AMF 506 may not know the UE's 502 SUPI (e.g., since it cannot communicate with the UE's 502 HPLMN to de-conceal the SUCI) and may not provide a SUPI to the SMF 508.

In various embodiments, the AMF 506 may include in the Nsmf_PDUSession_CreateSMContext request an indication to the SMF 508 to be informed that the UE 502 has successfully registered to PLMN-A 516 via the N3IWF 512. The AMF 506 may start a local timer to monitor whether the UE 502 has successfully registered with the PLMN-A 516. If the local timer expires and the AMF 506 does not receive an indication about the successful registration with PLMN-A 516, the AMF 506 may start a deregistration procedure with the UE 502.

In some embodiments, based on local configuration data for DisaC in the SMF 508 and additional indications from the AMF 506, the SMF 508 decides 538 to apply limited data connectivity to the requested PDU session so that communication with only specific destination addresses in the PLMN-A 516 are supported. For example, the SMF 508 may allow only communication with the N3IWF 512 in PLMN-A 516. The SMF 508 may discover the IP addresses (or IP prefixes) of all N3IWFs in PLMN-A 516 by using a domain name system ("DNS") system.

In a seventh communication 540 transmitted between the SMF 508 and the UPF 510, the SMF 508 sends to the UPF 510 the derived connectivity restrictions (e.g., the allowed N3IWF 512 addresses in PLMN-A 516). The UPF 510 applies these connectivity restrictions to the PDU session traffic.

In one embodiment, the SMF 508 may decide to configure the PDU session with a low (e.g., initial) bit rate (e.g., a session aggregate maximum bit rate ("Session-AMBR") or a per UE aggregate maximum bit rate ("UE-AMBR"). One reason for the low bit rate may be that at first a UE is supposed to use a PDU session for registration with the PLMN-A via N3IWF 512 and the IPsec establishment and NAS registration do not require a high bit rate. The SMF 508 configures the UPF 510 to detect and report back to the SMF 508 in response to the UE successfully establishing the IPsec tunnel or the UE registering with PLMN-A. Once the UPF 510 detects and indicates this information to the SMF 508, the SMF 508 may determine to increase the bit rate (e.g., Session-AMBR or improve other quality of service ("QoS") parameters like packet delay budget) for the PDU session. This would allow the UE 502 to use various services (e.g., voice or other multimedia services) in the PLMN-A. This embodiment ensures that malicious UEs which fake a disaster registration and/or fake a SUCI's PLMN (e.g., as described above) may only get a low bit rate for the entire life of the PDU session, as such the UE 502 may not be able to establish the IPsec tunnel or the UE 502 registers with PLMN-A. In other words, such malicious UEs may consume fewer resources in PLMN-B.

In an eighth communication 542 transmitted from the SMF 508 to the UE 502, the SMF 508 sends a PDU session establishment accept message to the UE 502. This message may indicate that data connectivity over the PDU session is limited to destination addresses in PLMN-A 516 (e.g., the N3IWF 512 being the destination address). Based on this indication, the UE 502 may locally block traffic sent via this PDU session which is not destined to the N3IWF 512 in PLMN-A 516. This indication may internally trigger the UE 502 to discover the N3IWF 512 in the PLMN-A 516 (e.g., in the HPLMN) and initiate 5G registration to PLMN-A 516 (e.g., HPLMN) via untrusted non-3GPP access using the discovered N3IWF 512.

In other words, the UE's 502 application and/or process responsible for the registration with PLMN-A 516 via N3IWF 512 may be triggered either after receiving the indication from the AMF 506 in step 532; or after receiving the indication from the SMF 508 in step 542. In certain embodiments, after the UE 502 receives step 542, the UE 502 triggers the registration with the PLMN-A 516 to obtain subscribed services from PLMN-A 516.

In a ninth communication 544 transmitted between the UE 502 and the UPF 510 and/or in a tenth communication 546 transmitted between the UPF 510 and the N3IWF 512, the UE 502 discovers the N3IWF 512 in PLMN-A 516 based on N3IWF discovery procedures and initiates a 5G registration via untrusted non-3GPP access with the discovered N3IW 512.

In an eleventh communication 548 transmitted between the UE 502 and the N3IWF 512, a twelfth communication 550 transmitted between the N3IWF 512 and the AMF 514, a thirteenth communication 552 transmitted from the AMF 514 to the N3IWF 512, and/or a fourteenth communication 554 transmitted from the N3IWF 512 to the UE 502, during 5G registration via untrusted non-3GPP access with the discovered N3IWF 512, the UE 502 sends a registration request message to the PLMN-A 516. The UE 502 may use the same SUPI and credentials for the registration as the SUPI and credentials in steps 526 and 528. Since the UE 502 is aware that the registration to PLMN-A 516 is due to DisaC, the UE 502 may additionally include a source PLMN ID (e.g., PLMN-B ID) to indicate to the PLMN-A 516 which PLMN is used for limited registration and data connectivity. The PLMN-A 516 may use this indication to count the number of UEs using the PLMN-B 518 services.

In a fifteenth communication 556 transmitted from the UPF 510 to the SMF 508 and/or in a sixteenth communication 558 transmitted from the SMF 508 to the AMF 506, the UPF 510 may determine whether the UE 502 has successfully registered to PLMN-A 516 via the N3IWF 512 (e.g., by performing deep-packet inspection ("DPI") techniques to inspect and analyze the traffic exchanged via the PDU session). The UPF 510 may verify whether the incoming packets are from the same source to which the UPF filters the outgoing (e.g., uplink) packets. After the UPF 510 has determined that the UE 502 has successfully registered to PLMN-A 516 via the N3IWF 512, the UPF 510 may inform the SMF 508. The SMF 508 may forward this indication to the AMF 506 (e.g., via an N11 message). This indication may be used by AMF 506 to verify whether the UE 502 has registered to PLMN-B 518 to connect to PLMN-A 516 or whether the UE 502 has registered to PLMN-B 518 in an attempt to misuse PLMN-B 518.

In certain embodiments, in response to the UPF 510 informing the SMF 508 that the UE 502 has established the IPsec tunnel or has registered with PLMN-A, the SMF 508 may increase and/or improve the resources (e.g., the bit rate, QoS parameters like packet delay budget) of the PDU session. The SMF 508 may update the UE 502 session management context stored at the SMF 508 and the SMF 508 may initiate a PDU session modification procedure to modify the QoS parameters in the UPF 510 and in the RAN 504.

If, after a pre-configured time period, the AMF 506 does not receive an indication by the SMF 508 that the UE 502 has successfully registered to PLMN-A 516 via the N3IWF 512, the AMF 506 may initiate 560 a deregistration procedure for the UE 502.

The SMF 508 may generate charging for data (e.g., offline charging) for the UE 502. As there are no roaming interfaces in place between PLMN-A 516 and PLMN-B 518, the PLMN-A 516 may have an agreement with PLMN-B 518 to pay a flat-rate per user or per size of the disaster area.

While the UE 502 is registered with PLMN-A, a disaster condition may be resolved (e.g., the failure of the PLMN-A's RAN 404 may have recovered). In such a situation, the AMF 514 in PLMN-A may initiate a deregistration procedure with a transmission transmitted toward the UE 502 and may indicate to the UE 502 that the disaster condition has recovered. Such an indication may trigger the UE 502 to initiate a deregistration procedure with PLMN-B. In addition, the UE 502 may enter a deregistered normal state—meaning that the UE 502 applies a normal network selection procedure (e.g., not applying network selection for a disaster condition).

As may be appreciated, a benefit of various embodiments described herein may be that disaster inbound roamers in PLMN-B 518 may use services (e.g., default connectivity service) to home networks (e.g., PLMN-A 516) although there are no roaming interfaces in place between PLMN-B 518 and PLMN-A 516. After disaster inbound roamers successfully register with PLMN-A 516 via the N3IWF 512, they may use any of the subscribed services (e.g., IMS voice, short message service ("SMS"), data service).

In certain embodiments, an AMF may: send in a registration accept message an indication to a UE indicating that only a single PDU session is allowed which may be additionally restricted for communication with a specific destination (e.g., with an N3IWF in PLMN-A); send the following new indications to an SMF during a PDU session establishment procedure: 1) a PDU session is for DisaC, 2) an indication of which PLMN ID a UE belongs to (e.g., PLMN-A or HPLMN ID), and/or 3) to request confirmation that the UE has successfully registered to PLMN-A via an N3IWF; and/or start a local timer during the PDU session establishment procedure for DisaC. If the AMF does not receive a confirmation that the UE has successfully registered to PLMN-A upon expiration of the timer, the AMF initiates a deregistration procedure for the UE.

In some embodiments, an SMF may: receive at least one of the following indications during PDU session establishment: 1) the PDU session is for a UE with limited registration for DisaC, 2) the PLMN ID to which the UE belongs (e.g., the PLMN-A or HPLMN ID), and/or 3) request for confirmation that the UE has successfully registered to PLMN-A via an N3IWF; determine to apply a limited connectivity service for the PDU session (e.g., derive an allowed target destination address/IP address based on the PLMN-A N3IWF address; instruct and/or configure the UPF to apply at least one of: 1) data filtering rules for destination IP addresses, and/or 2) to inspect and report whether an IPsec association is successfully established between the UE and the N3IWF in the PLMN-A; and/or receive an indication from the UPF that the UE has successfully registered with the PLMN-A and forward this indication to the AMF.

In various embodiments, a UPF may apply a configuration from an SMF to inspect and report whether an IPsec association is successfully established between a UE and a N3IWF in a PLMN-A.

In certain embodiments, a UE may apply a restricted connectivity indicated in a PDU session establishment accept message to trigger upper layers to establish connectivity to a PLMN-A using an untrusted non-3GPP access via the PDU session and may not request further PDU sessions.

FIG. 6 is a flow chart diagram illustrating one embodiment of a method 600 for data connection establishment in response to a disaster condition. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes receiving 602, at a first network function in a first mobile communication network, a first message from a second network function in the first mobile communication network, wherein the first message includes a data connection establishment request from a remote unit and a disaster indication indicating that the data connection establishment request is in response to a disaster condition in a second mobile communication network, and the disaster condition disables the remote unit from connecting to the second mobile connection network. In some embodiments, the method 600 includes determining 604 a plurality of destination addresses in the second mobile communication network. In various embodiments, the method 600 includes configuring 606 a data connection corresponding to the data connection establishment request to accept data traffic between the remote unit and the plurality of destination addresses. In certain embodiments, the method 600 includes transmitting 608 a second message to the second network function, wherein the second message comprises a data connection establishment accept response for the remote unit, and the data connection establishment accept response triggers the remote unit to initiate registration with the second mobile communication network using the data connection and one of the plurality of destination addresses.

In certain embodiments, the first network function comprises a session management function. In some embodiments, the second network function comprises an access and mobility management function. In various embodiments, the remote unit registers with the second mobile communication network by exchanging data traffic with a destination address via the data connection.

In one embodiment, configuring the data connection corresponding to the data connection establishment request to accept data traffic between the remote unit and the plurality of destination addresses comprises configuring the data connection to only accept data traffic between the remote unit and the plurality of destination addresses. In certain embodiments, the data connection establishment accept response comprises an indication that indicates that the data connection supports communication with one destination address of the plurality of destination addresses.

In one embodiment, the disaster indication is provided by the second network function and is included in the first message separate from the data connection establishment request. In certain embodiments, determining the plurality of destination addresses comprises resolving a fully-qualified domain name associated with the second mobile communication network to a plurality of internet protocol addresses.

In some embodiments, the fully-qualified domain name is a non-third generation partnership project interworking function fully-qualified domain name in the second mobile communication network. In various embodiments, configuring the data connection corresponding to the data connection establishment request to accept data traffic between the remote unit and the plurality of destination addresses further comprises configuring a user plane function serving the data connection to allow only traffic to the plurality of destination addresses and to determine whether the remote unit successfully registers with the second mobile communication network via the data connection, and wherein the data connection is initially configured with a low bit rate. In one embodiment, the user plane function sends a notification to the first network function after determining that the remote unit successfully registers with the second mobile communication network via the data connection.

In certain embodiments, the first network function sends the notification to the second network function.

Figure 7:
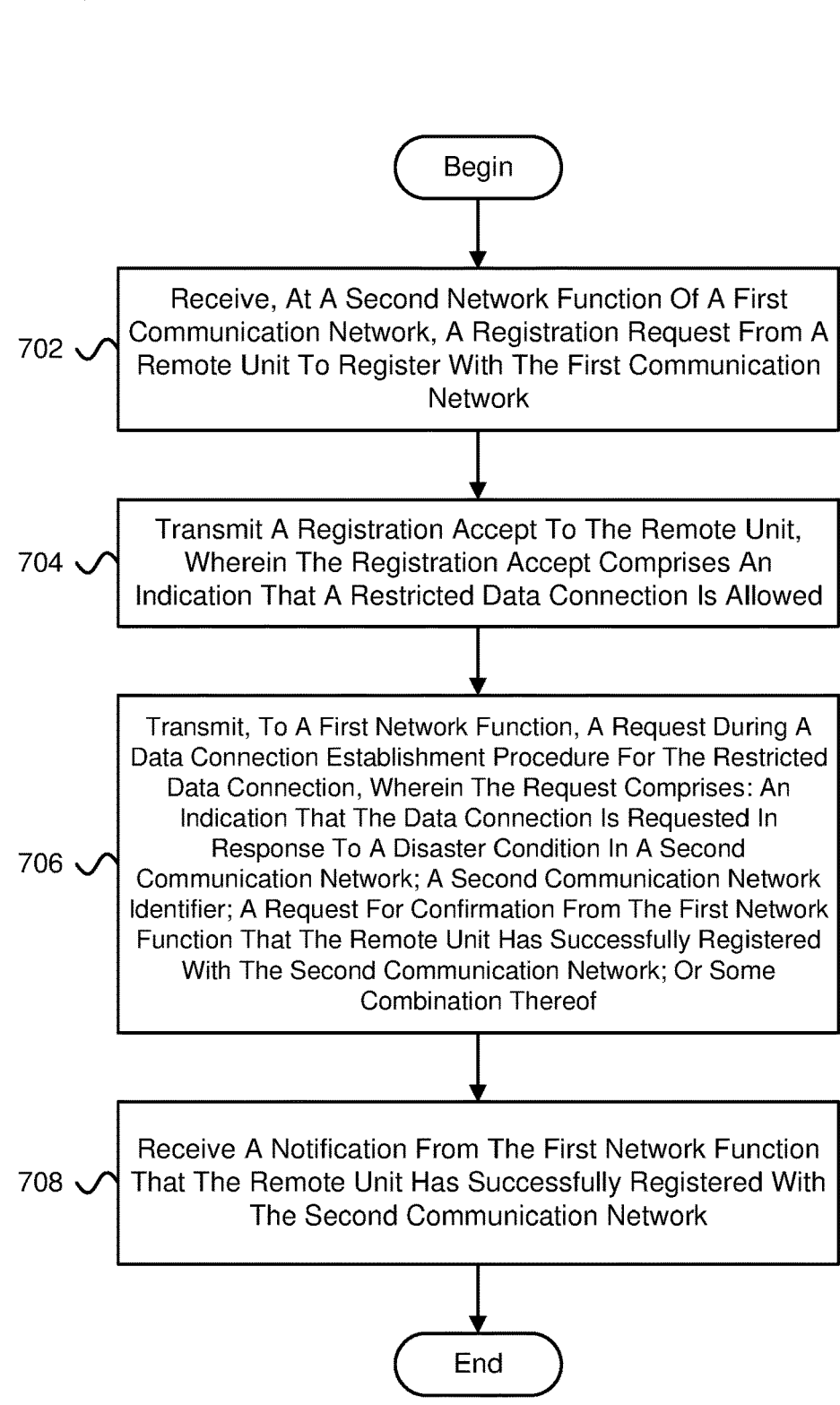
FIG. 7 is a flow chart diagram illustrating another embodiment of a method for data connection establishment in response to a disaster condition.

FIG. 7 is a flow chart diagram illustrating another embodiment of a method 700 for data connection establishment in response to a disaster condition. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702, at a second network function of a first communication network, a registration request from a remote unit (e.g., the remote unit 102) to register with the first communication network. In some embodiments, the method 700 includes transmitting 704 a registration accept to the remote unit. The registration accept includes an indication that a restricted data connection is allowed. In various embodiments, the method 700 includes transmitting 706, to a first network function, a request during a data connection establishment procedure for the restricted data connection, wherein the request comprises: an indication that the data connection is requested in response to a disaster condition in a second communication network; a second communication network identifier; a request for confirmation from the first network function that the remote unit has successfully registered with the second communication network; or some combination thereof. In certain embodiments, the method 700 includes receiving 708 a notification from the first network function that the remote unit has successfully registered with the second communication network.

In certain embodiments, the first network function comprises a session management function. In some embodiments, the second network function comprises an access and mobility management function. In various embodiments, the second network function starts a timer in response to sending to the first network function the request during the restricted data connection establishment procedure.

In one embodiment, the second network function terminates the timer in response to receiving information indicating successful registration with the second communication network. In certain embodiments, the second network function initiates a deregistration procedure with the remote unit in response to the timer expiring before receiving a response for successful registration with the second communication network.

FIG. 8 is a flow chart diagram illustrating a further embodiment of a method 800 for data connection establishment in response to a disaster condition. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes transmitting 802, from a remote unit (e.g., the remote unit 102), a first request to connect with a first communication network. In some embodiments, the method 800 includes receiving 804 a registration accept including an indication that a restricted data connection is allowed. In various embodiments, the method 800 includes transmitting 806 a request for establishing the restricted data connection with the first communication network. In certain embodiments, the method 800 includes receiving 808 a response to the request establishing the restricted data connection. The response indicates that the restriction of the data connection applies to traffic transmitted toward a second communication network.

In certain embodiments, the registration request comprises an indication that registration is in response to a disaster condition in a second communication network. In various embodiments, the restriction of the data connection applies to traffic transmitted toward a non-third generation partnership project interworking function address.

In one embodiment, the remote unit initiates a registration with a second communication network via the data connection of the first communication network. In certain embodiments, the registration with the second communication network is via an untrusted non-third generation partnership project access.

In one embodiment, a method comprises: receiving, at a first network function in a first mobile communication network, a first message from a second network function in the first mobile communication network, wherein the first message comprises a data connection establishment request from a remote unit and a disaster indication indicating that the data connection establishment request is in response to a disaster condition in a second mobile communication network, and the disaster condition disables the remote unit from connecting to the second mobile connection network; determining a plurality of destination addresses in the second mobile communication network; configuring a data connection corresponding to the data connection establishment request to accept data traffic between the remote unit and the plurality of destination addresses; and transmitting a second message to the second network function, wherein the second message comprises a data connection establishment accept response for the remote unit, and the data connection establishment accept response triggers the remote unit to initiate registration with the second mobile communication network using the data connection and one of the plurality of destination addresses.

In certain embodiments, the first network function comprises a session management function.

In some embodiments, the second network function comprises an access and mobility management function.

In various embodiments, the remote unit registers with the second mobile communication network by exchanging data traffic with a destination address via the data connection.

In one embodiment, configuring the data connection corresponding to the data connection establishment request to accept data traffic between the remote unit and the plurality of destination addresses comprises configuring the data connection to only accept data traffic between the remote unit and the plurality of destination addresses.

In certain embodiments, the data connection establishment accept response comprises an indication that indicates that the data connection supports communication with one destination address of the plurality of destination addresses.

In one embodiment, the disaster indication is provided by the second network function and is included in the first message separate from the data connection establishment request.

In certain embodiments, determining the plurality of destination addresses comprises resolving a fully-qualified domain name associated with the second mobile communication network to a plurality of internet protocol addresses.

In some embodiments, the fully-qualified domain name is a non-third generation partnership project interworking function fully-qualified domain name in the second mobile communication network.

In various embodiments, configuring the data connection corresponding to the data connection establishment request to accept data traffic between the remote unit and the plurality of destination addresses further comprises configuring a user plane function serving the data connection to allow only traffic to the plurality of destination addresses and to determine whether the remote unit successfully registers with the second mobile communication network via the data connection, and wherein the data connection is initially configured with a low bit rate.

In one embodiment, the user plane function sends a notification to the first network function after determining that the remote unit successfully registers with the second mobile communication network via the data connection.

In certain embodiments, the first network function sends the notification to the second network function.

In one embodiment, an apparatus comprises a first network function in a first mobile communication network. The apparatus further comprises: a receiver that receives a first message from a second network function in the first mobile communication network, wherein the first message comprises a data connection establishment request from a remote unit and a disaster indication indicating that the data connection establishment request is in response to a disaster condition in a second mobile communication network, and the disaster condition disables the remote unit from connecting to the second mobile connection network; a processor that: determines a plurality of destination addresses in the second mobile communication network; and configures a data connection corresponding to the data connection establishment request to accept data traffic between the remote unit and the plurality of destination addresses; and a transmitter that transmits a second message to the second network function, wherein the second message comprises a data connection establishment accept response for the remote unit, and the data connection establishment accept response triggers the remote unit to initiate registration with the second mobile communication network using an address of a non-third generation partnership project interworking function.

In certain embodiments, the first network function comprises a session management function.

In some embodiments, the second network function comprises an access and mobility management function.

In various embodiments, the remote unit registers with the second mobile communication network by exchanging data traffic with a destination address via the data connection.

In one embodiment, the processor configuring the data connection corresponding to the data connection establishment request to accept data traffic between the remote unit and the plurality of destination addresses comprises the processor configuring the data connection to only accept data traffic between the remote unit and the plurality of destination addresses.

In certain embodiments, the data connection establishment accept response comprises an indication that indicates that the data connection supports communication with one destination address of the plurality of destination addresses.

In one embodiment, the disaster indication is provided by the second network function and is included in the first message separate from the data connection establishment request.

In certain embodiments, the processor determining the plurality of destination addresses comprises the processor resolving a fully-qualified domain name associated with the second mobile communication network to a plurality of internet protocol addresses.

In some embodiments, the fully-qualified domain name is a non-third generation partnership project interworking function fully-qualified domain name in the second mobile communication network.

In various embodiments, the processor configuring the data connection corresponding to the data connection establishment request to accept data traffic between the remote unit and the plurality of destination addresses further comprises the processor configuring a user plane function serving the data connection to allow only traffic to the plurality of destination addresses and to determine whether the remote unit successfully registers with the second mobile communication network via the data connection, and wherein the data connection is initially configured with a low bit rate.

In one embodiment, the user plane function sends a notification to the first network function after determining that the remote unit successfully registers with the second mobile communication network via the data connection.

In certain embodiments, the first network function sends the notification to the second network function.

In one embodiment, a method comprises: receiving, at a second network function of a first communication network, a registration request from a remote unit to register with the first communication network; transmitting a registration accept to the remote unit, wherein the registration accept comprises an indication that a restricted data connection is allowed; transmitting, to a first network function, a request during a data connection establishment procedure for the restricted data connection, wherein the request comprises: an indication that the data connection is requested in response to a disaster condition in a second communication network; a second communication network identifier; a request for confirmation from the first network function that the remote unit has successfully registered with the second communication network; or some combination thereof; and receiving a notification from the first network function that the remote unit has successfully registered with the second communication network.

In certain embodiments, the first network function comprises a session management function.

In some embodiments, the second network function comprises an access and mobility management function.

In various embodiments, the second network function starts a timer in response to sending to the first network function the request during the restricted data connection establishment procedure.

In one embodiment, the second network function terminates the timer in response to receiving information indicating successful registration with the second communication network.

In certain embodiments, the second network function initiates a deregistration procedure with the remote unit in response to the timer expiring before receiving a response for successful registration with the second communication network.

In one embodiment, an apparatus comprises a second network function of a first communication network. The apparatus further comprises: a receiver that receives a registration request from a remote unit to register with the first communication network; and a transmitter that: transmits a registration accept to the remote unit, wherein the registration accept comprises an indication that a restricted data connection is allowed; and transmits, to a first network function, a request during a data connection establishment procedure for the restricted data connection, wherein the request comprises: an indication that the data connection is requested in response to a disaster condition in a second communication network; a second communication network identifier; a request for confirmation from the first network function that the remote unit has successfully registered with the second communication network; or some combination thereof; wherein the receiver receives a notification from the first network function that the remote unit has successfully registered with the second communication network.

In certain embodiments, the first network function comprises a session management function.

In some embodiments, the second network function comprises an access and mobility management function.

In various embodiments, the second network function starts a timer in response to sending to the first network function the request during the restricted data connection establishment procedure.

In one embodiment, the second network function terminates the timer in response to receiving information indicating successful registration with the second communication network.

In certain embodiments, the second network function initiates a deregistration procedure with the remote unit in response to the timer expiring before receiving a response for successful registration with the second communication network.

In one embodiment, a method comprises: transmitting, from a remote unit, a first request to connect with a first communication network; receiving a registration accept comprising an indication that a restricted data connection is allowed; transmitting a request for establishing the restricted data connection with the first communication network; and receiving a response to the request for establishing the restricted data connection, wherein the response indicates that the restriction of the data connection applies to traffic transmitted toward a second communication network.

In certain embodiments, the registration request comprises an indication that registration is in response to a disaster condition in a second communication network.

In various embodiments, the restriction of the data connection applies to traffic transmitted toward a non-third generation partnership project interworking function address.

In one embodiment, the remote unit initiates a registration with a second communication network via the data connection of the first communication network.

In certain embodiments, the registration with the second communication network is via an untrusted non-third generation partnership project access.

In one embodiment, an apparatus comprises a remote unit. The apparatus further comprises: a transmitter that transmits a first request to connect with a first communication network; and a receiver that receives a registration accept comprising an indication that a restricted data connection is allowed; wherein: the transmitter transmits a request for establishing the restricted data connection with the first communication network; and the receiver receives a response to the request for establishing the restricted data connection, wherein the response indicates that the restriction of the data connection applies to traffic transmitted toward a second communication network.

In certain embodiments, the registration request comprises an indication that registration is in response to a disaster condition in a second communication network.

In various embodiments, the restriction of the data connection applies to traffic transmitted toward a non-third generation partnership project interworking function address.

In one embodiment, the remote unit initiates a registration with a second communication network via the data connection of the first communication network.

In certain embodiments, the registration with the second communication network is via an untrusted non-third generation partnership project access.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for performing a network function, the apparatus comprising:

at least one memory; and at least one processor coupled with the at least one memory and configured to cause the apparatus to:

receive a first message from a second network function in a first mobile communication network (CNET), wherein the first message comprises a data connection establishment request from a user equipment (UE) and a disaster indication indicating that the data connection establishment request is in response to a disaster condition in a second mobile CNET, and the disaster condition disables the UE from connecting to the second mobile CNET;

determine a plurality of destination addresses in the second mobile CNET, wherein, to determine the plurality of destination addresses, the at least one processor is configured to cause the apparatus to resolve a fully-qualified domain name corresponding to the second mobile CNET to a plurality of internet protocol addresses;

configure a data connection corresponding to the data connection establishment request to accept data traffic between the UE and the plurality of destination addresses; and transmit a second message to the second network function, wherein the second message comprises a data connection establishment accept response for the UE, and the data connection establishment accept response triggers the UE to initiate registration with the second mobile CNET using an address of a non-third generation partnership project (non-3GPP) interworking function.

2. An apparatus for performing a network function, the apparatus further comprising:

at least one memory; and at least one processor coupled with the at least one memory and configured to cause the apparatus to:

receive a registration request from a user equipment (UE) to register with a first communication network (CNET);

transmit a registration accept to the UE, wherein the registration accept comprises an indication that a restricted data connection is allowed;

transmit, to a first network function, a request during a data connection establishment procedure for the restricted data connection, wherein the request comprises:

an indication that the data connection is requested in response to a disaster condition in a second CNET;

a second CNET identifier;

a request for confirmation from the first network function that the UE has successfully registered with the second CNET;

or a combination thereof; and receive a notification from the first network function that the UE has successfully registered with the second CNET, wherein a plurality of destination addresses are determined in the second CNET by resolving a fully-qualified domain name corresponding to the second CNET to a plurality of internet protocol addresses.

3. A user equipment (UE), comprising:

at least one memory; and at least one processor coupled with the at least one memory and configured to cause the UE to:

transmit a first request to connect with a first communication network (CNET);

receive a registration accept comprising an indication that a restricted data connection is allowed;

transmit a request for establishing the restricted data connection with the first CNET; and receive a response to the request for establishing the restricted data connection, wherein the response indicates that the restriction of the data connection applies to traffic transmitted toward a plurality of destination addresses in a second CNET, the plurality of destination addresses obtained by resolving a fully-qualified domain name corresponding to the second CNET to a plurality of internet protocol addresses.

4. The apparatus of claim 1, wherein the UE registers with the second mobile CNET by exchanging data traffic with a destination address via the data connection.

5. The apparatus of claim 1, wherein configuring the data connection corresponding to the data connection establishment request to accept data traffic between the UE and the plurality of destination addresses comprises configuring the data connection to only accept data traffic between the UE and the plurality of destination addresses.

6. The apparatus of claim 1, wherein the data connection establishment accept response comprises an indication that indicates that the data connection supports communication with one destination address of the plurality of destination addresses.

7. The apparatus of claim 1, wherein the disaster indication is provided by the second network function and is included in the first message separate from the data connection establishment request.

8. The apparatus of claim 1, wherein the fully-qualified domain name is a non-third generation partnership project interworking function fully-qualified domain name in the second mobile CNET.

9. The apparatus of claim 1, wherein configuring the data connection corresponding to the data connection establishment request to accept data traffic between the UE and the plurality of destination addresses further comprises configuring a user plane function serving the data connection to allow only traffic to the plurality of destination addresses and to determine whether the UE successfully registers with the second mobile CNET via the data connection, and wherein the data connection is initially configured with a low bit rate.

10. The apparatus of claim 9, wherein the user plane function sends a notification to the network function after determining that the UE successfully registers with the second mobile CNET via the data connection.

11. The apparatus of claim 10, wherein the first network function sends the notification to the second network function.

12. The apparatus of claim 2, wherein the apparatus starts a timer in response to sending to the first network function the request during the restricted data connection establishment procedure.

13. The apparatus of claim 12, wherein the apparatus terminates the timer in response to receiving information indicating successful registration with the second CNET.

14. The apparatus of claim 12, wherein the apparatus initiates a deregistration procedure with the UE in response to the timer expiring before receiving a response for successful registration with the second CNET.

15. The UE of claim 3, wherein the registration request comprises an indication that registration is in response to a disaster condition in a second CNET.

16. The UE of claim 3, wherein the restriction of the data connection applies to traffic transmitted toward a non-third generation partnership project interworking function address.

17. A processor for wireless communication, comprising:

at least one controller coupled with at least one memory and configured to cause the processor to:

transmit a first request to connect with a first CNET; and receive a registration accept comprising an indication that a restricted data connection is allowed;

wherein:

the at least one controller is configured to cause the processor to transmit a request for establishing the restricted data connection with the first CNET; and the at least one controller is configured to cause the processor to receive a response to the request for establishing the restricted data connection, wherein the response indicates that the restriction of the data connection applies to traffic transmitted toward a plurality of destination addresses in a second CNET, the plurality of destination addresses obtained by resolving a fully-qualified domain name corresponding to the second CNET to a plurality of internet protocol addresses.

18. The processor of claim 17, wherein the registration request comprises an indication that registration is in response to a disaster condition in a second CNET.

19. The processor of claim 17, wherein the restriction of the data connection applies to traffic transmitted toward a non-third generation partnership project interworking function address.

* * * * *